United States Patent [19]

Wied et al.

[11] Patent Number: 5,401,222
[45] Date of Patent: Mar. 28, 1995

[54] DEVICE FOR INFLUENCING THE STARTING OF THE INTERNAL COMBUSTION ENGINE OF A MOTOR VEHICLE WITH ELECTRONICALLY CONTROLLED GEARBOX

[75] Inventors: Henrich Wied, Schweikheim; Ludwig Bauer, Stuttgart; Bernd Bertsche, Nürtingen, all of Germany

[73] Assignee: Mercedes-Benz AG, Germany

[21] Appl. No.: 64,640

[22] Filed: May 21, 1993

[30] Foreign Application Priority Data

Jun. 6, 1992 [DE] Germany ............... 42 18 708.7

[51] Int. Cl.$^6$ ................. F02P 11/00; F02N 11/10
[52] U.S. Cl. ................................ 477/99; 477/103
[58] Field of Search .......... 74/844, 850, 856, 878; 123/179.23; 477/99, 101, 103

[56] References Cited

U.S. PATENT DOCUMENTS

| | | |
|---|---|---|
| 1,231,637 | 7/1917 | Nikonow . |
| 4,033,311 | 7/1977 | Burson ............... 123/179 |
| 4,223,657 | 9/1980 | Sato et al. ............ 123/179 |
| 4,295,540 | 10/1981 | Hildebrecht ........... 123/179.23 |
| 4,369,745 | 1/1983 | Howard ............... 123/198 |
| 4,976,171 | 12/1990 | Sharp et al. ........... 74/878 |
| 5,005,445 | 4/1991 | Gierer ................. 74/878 |
| 5,101,802 | 4/1992 | Reinhard .............. 123/630 |
| 5,188,070 | 2/1993 | Otsuica et al. ......... 123/179.23 |
| 5,252,861 | 10/1993 | Steeby et al. .......... 123/179.23 |

Primary Examiner—John T. Kwon
Assistant Examiner—Hoang Nguyen
Attorney, Agent, or Firm—Evenson, McKeown, Edwards & Lenahan

[57] ABSTRACT

A device is provided for influencing starting of an internal combustion engine of a motor vehicle that has an electronically controlled gearbox, an electrically acting interlock that prevents the internal combustion engine from being put into operation when a gearbox status causing a driving force connection is selected, and a starter with an electromagnetic disengagement switch that is suppliable with battery current from an ignition switch during actuation of the starter. The device has an electronic engine control unit for at least one of ignition and metering of fuel, with a communicative connection communicatively connecting the engine control unit to the gearbox control. A direct connection is provided from the ignition switch to the electromagnetic disengagement switch for supplying battery current to the electromagnetic disengagement switch without an intermediate disabling switch. A recorder records the position of an element influencing the gear-selection status of the gearbox and transmits a corresponding signal to the gearbox control. The gearbox control acts upon the engine control unit via the communicative connection to disable at least one of the ignition and the fuel metering when the element influencing the gear-selection status of the gearbox is in a position which normally effects a driving force connection through the gearbox.

10 Claims, 2 Drawing Sheets

DEVICE FOR INFLUENCING THE STARTING OF THE INTERNAL COMBUSTION ENGINE OF A MOTOR VEHICLE WITH ELECTRONICALLY CONTROLLED GEARBOX

BACKGROUND AND SUMMARY OF THE INVENTION

The present invention relates to a device for influencing the starting of an internal combustion engine of a motor vehicle that has an electronically controlled gearbox, an electrically acting interlock that prevents the internal combustion engine from being put into operation when a gearbox status causing a driving force connection is selected, and a starter with an electromagnetic disengagement switch that is suppliable with battery current from an ignition switch during actuation of the starter.

In vehicles with automatic gearboxes currently in series production, a starting interlock is provided which is intended to prevent the engine from being started in any of the driving positions "R", "D", "3", "2" or "1" of the selector lever of the automatic gearbox. As shown in FIG. 4, the starting control conductor 18 for the magnetic switch 14 of the starter 13 is generally led from the ignition switch 17 to a so-called starting interlock switch 20, which is only closed in the selector lever positions "P" and "N". From the starting interlock switch 20, the starter engagement conductor 22 leads through a sealing location 23 in the engine compartment to the magnetic switch 14 of the starter 13. The starter 13 can therefore only be initiated and, in consequence, the internal combustion engine can only be started if the interlock switch 20 is closed, i.e., if the selector lever is located in one of the positions "P" or "N".

The starting interlock switch is generally located on the selector block of the selector lever or on the automatic gearbox. The arrangement of the selector lever on the gearbox has the advantage that transmission tolerances between the selector lever and the gearbox actuation cannot lead to starting in a driving position of the gearbox. Starting interlock switches which are arranged directly on the selector plate in the automatic gearbox are also known. This also makes it possible to exclude transmission tolerances, between the gearbox actuation and the elements of the selector plate determining the gear, as a possible cause for erroneous starting of the internal combustion engine with a force connection in the drive train.

This is, however, problematic if the interlock switch becomes defective by its contact elements welding together, for example. A switch then permanently "closed" in such a way means that the internal combustion engine can be started with force connection in the gearbox. This condition is particularly critical because the error can only be discovered when the dangerous situation has already occurred (a so-called "sleeping fault"). Another result with respect to the electrical installation in the vehicle is the requirement to lay a relatively thick conductor which is capable of carrying the high current of the magnetic switch on the starter from the ignition switch out of the passenger compartment to the gearbox or to its gear-selection control. Because vibration zones have to be bridged over in this process, laying a corresponding conductor requires correspondingly more attention and time as the conductor becomes thicker and, in consequence, stiffer. In the case of the variant which is most tolerant to faults, in which the starting interlock switch is arranged in the gearbox, this conductor, which is therefore looped into the gearbox, must be protected in a particularly complicated manner against short circuit and ground short.

U.S. Pat. No. 1,231,637 describes a mechanically acting device for avoiding a simultaneous driving force connection between the internal combustion engine and the driving train and between the internal combustion engine and the starter such that intervention in the starter is impossible when the first-mentioned connection is made.

U.S. Pat. No. 4,033,311 describes an electronic ignition system for the internal combustion engine of a motor vehicle which prevents the internal combustion engine from being started when the clutch, the gearbox, the brake or a similar device is not in a safe position with respect to the starting procedure.

This system provides safety switches located in the ignition current path and actuated as a function of the clutch position and the load connection. These switches are connected in series and are closed when the internal combustion engine can be started without danger.

U.S. Pat. No. 5,101,802 describes an electronic ignition system for a magneto-ignition internal combustion engine which can be optionally started by motor or manually. In this system, a safety switch in series with the ground connection of the magnet coil is closed, for example, only in a neutral position of the gear-selection switch so that initial induction of the ignition voltage is only possible in the mentioned gear position.

An object of the invention is, therefore, to provide a device for influencing the starting of the internal combustion engine of a motor vehicle with an electronically controlled gearbox, which device has, on the one hand, a high level of imminent safety against unallowable starting of the internal combustion engine and, on the other, leads to a simplification of the electrical installation in the vehicle.

This and other objects are achieved by the present invention which provides a device for influencing starting of an internal combustion engine of a motor vehicle that has an electronically controlled gearbox, an electrically acting interlock that prevents the internal combustion engine from being put into operation when a gearbox status causing a driving force connection is selected, and a starter with an electromagnetic disengagement switch that is suppliable with battery current from an ignition switch during actuation of the starter. The device comprises an electronic engine control unit for at least one of ignition and metering of fuel, with a communicative connection communicatively connecting the engine control unit to the gearbox control. A direct connection is provided from the ignition switch to the electromagnetic disengagement switch for supplying battery current to the electromagnetic disengagement switch without an intermediate disabling switch. A recorder records the position of an element influencing the gear-selection status of the gearbox and transmits a corresponding signal to the gearbox control. The gearbox control acts upon the engine control unit via the communicative connection to disable at least one of the ignition and the fuel metering when the element influencing the gear-selection status of the gearbox is in a position which normally effects a driving force connection through the gearbox.

The signal initiating the disabling of the ignition and/or fuel metering can therefore be transmitted within a serial twin-wire or optical bus log as a datum which normally puts the internal combustion engine out of operation. It is possible to interrogate both the selector lever actuated by the vehicle driver and a gearbox-end control element, by whose change in position changes to the gear-selection status of the gearbox are necessarily initiated directly. A switch, which is therefore electrically only slightly loaded, can be used for this purpose.

By an additional disabling status conductor between the gearbox control system and the electronic engine control unit, which can be provided in practice with practically no complication, a separate disabling signal can be transmitted to the engine control unit independently of and redundant to the previously mentioned serial bus connection between the gearbox control system and the electronic engine control unit. This increases both safety and the ability to recognize faults.

In accordance with the present invention, provision is also made so that where at least one disabling signal is not output to the electronic engine control unit, the gearbox is, in any event, driven into its neutral gear-selection status "N".

In accordance with the invention, it is also possible to dispense with the separate disabling status conductor if, in the presence of a gear-selection status of the gearbox with driving force connection (i.e. not "P" or "N") when the vehicle is stationary, a signal value which normally reports the gear-selection status back to the gearbox control system is altered into an invalid signal value, for example by means of a corresponding switch, this value being discriminated by appropriate means in the gearbox control system and processed to provide a disabling signal which can be emitted to the electronic engine control unit.

Other objects, advantages and novel features of the present invention will become apparent from the following detailed description of the invention when considered in conjunction with the accompanying drawings.

DETAILED DESCRIPTION OF THE DRAWINGS

Figure 1:
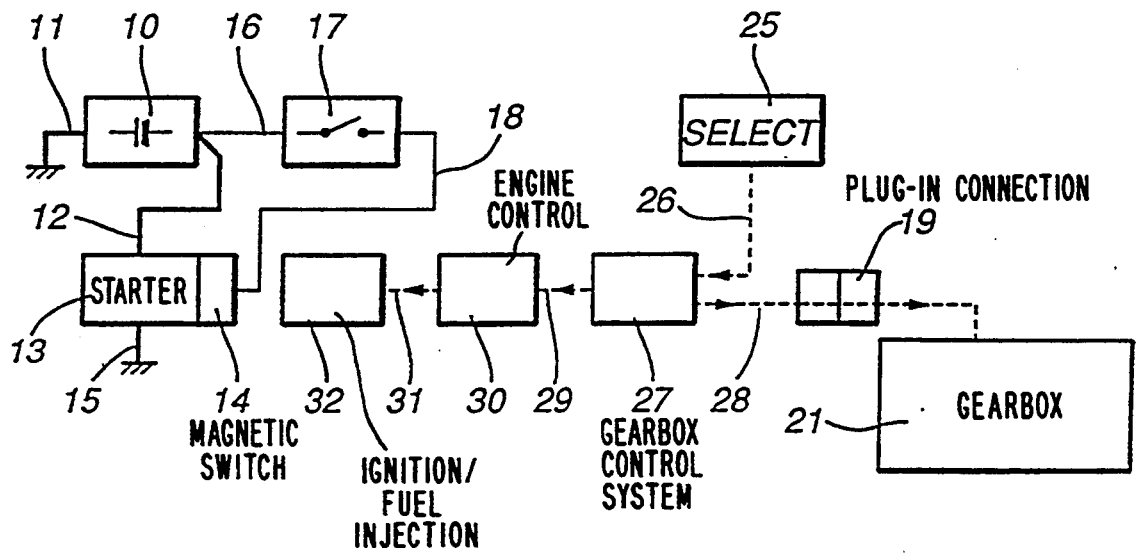
FIG. 1 shows a diagrammatic block circuit diagram of a first exemplary embodiment.

In FIG. 1, the starting control conductor 18 in the device according to the present invention is not routed to the gearbox 21 but directly from the ignition switch 17 to the magnetic switch 14 of the starter 13. An electronic gearbox control system 27 receives the position of a selector lever 25 via an instruction path 26. A control path 28 leads from the gearbox control system 27 via a plug-in connection 19 to the gearbox 21; control valves and selector valves in the gearbox 21 are triggered via this path.

The arrangement includes a battery 10 coupled to ground via connector 11, to the ignition switch 17 via connector 16, and to the starter 13 via connection 12. The starter is connected to ground via connector 15.

The gearbox control system 27 is connected with the engine control unit 30 via a communication path 29, preferably, for example, of the CAN bus type. The motor control unit 30 controls the electronic ignition or the injection pump 32 of the internal combustion engine (not shown) via the control path 31.

The electronic gearbox control system 27 continuously interrogates the position of the selector lever 25 and transmits the current selector lever position or a status signal derived from it via the communication path 29 to the engine control unit 30. The engine control unit 30 only releases the ignition and/or fuel injection 32 when the selector lever 25 is in one of the positions "P" or "N", i.e. is not in one of the positions "R", "D", "3", "2" and "1". The gearbox 21 is, in any event, held by this means in its basic hydraulic position "N", or is shifted into it. It is therefore possible to accept the fact that the starter 13 spins when the ignition switch 17 is actuated because the fuel supply and/or ignition is suppressed when the selector lever 25 is in an impermissible position.

This simplest possibility for a starting interlock according to the invention therefore also removes the problem of sufficient high current reliability of the plug-in connection 19 on the gearbox 21 because only relatively weak control currents for control valves and selector slides, etc. (possibly inside the gearbox 21) now pass via this plug-in connection 19. Provided the transmission section between the selector lever 25 and the selector slide on the gearbox 21 can be embodied with a slight tolerance clearance not exceeding a maximum amount, a "sleeping fault" of the type described earlier.

If, however, tolerances or faulty adjustments between the selector lever 25 and the selector slide on the gearbox 21 or the elements determining the gear (for example selector lever 25 on "P" or "N" but selector slide already on "D" or "R") are not located within limits which can be guaranteed, it would not be possible to exclude uncontrolled vehicle motions entirely.

Figure 2:
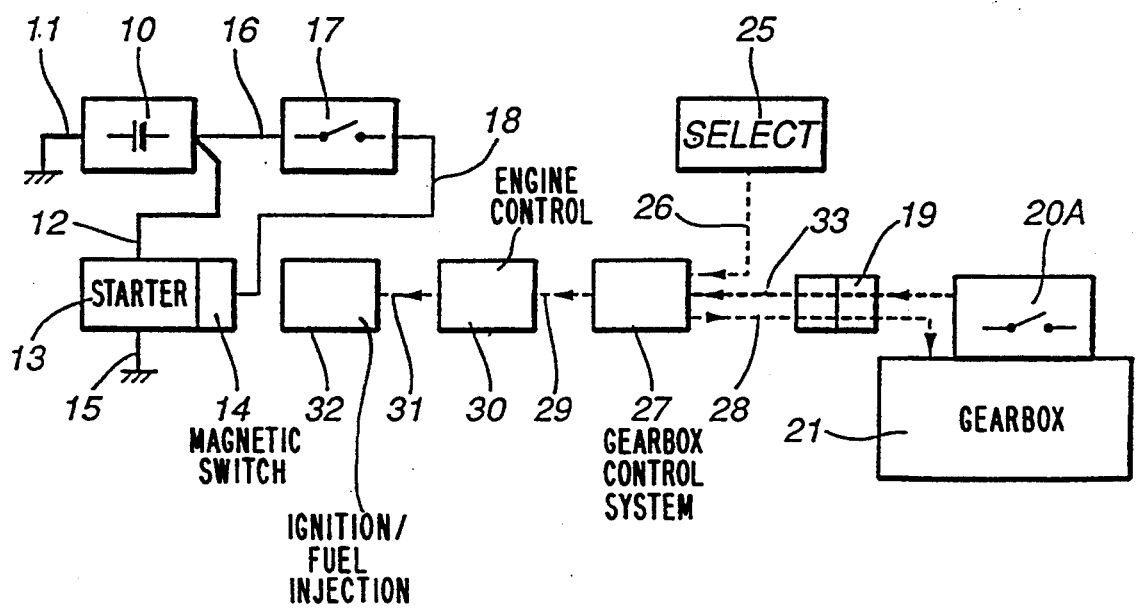
FIG. 2 shows a diagrammatic block circuit diagram of second and third exemplary embodiments.

The embodiment according to FIG. 2 obviates this problem. In this case, a switch 20a influenced by the position of the selector slide or the elements determining the gear is again provided. This switch 20a therefore reads out the current selector status which is actually effective with respect to an existing or nonexisting driving force connection (actual effective selector status "P" or "N"). An additional effective status conductor 33 leads from this switch 20a via the plug-in connection 19 to the electronic gearbox control system 27.

In contrast to known solutions, the switch 20a does not in this case have to meet demands for current carrying capability because it subjects the gearbox control system 27 to a potential, practically without current. This excludes a defect in this switch 20a due to its contact elements welding together. In addition, this 20a switch offers the possibility of recording inaccuracies or positional discrepancies between the electronically scanned selector lever position and the actually achieved and actually effective position of the selector slide on the gearbox (i.e. its effective gear-selection status) actuating the switch 20a. In other words, this embodiment provides the possibility of actively recognizing, as early as possible, a lack of precision in the selection which is rather large or becoming too large and of displaying it as a fault.

Figure 4:
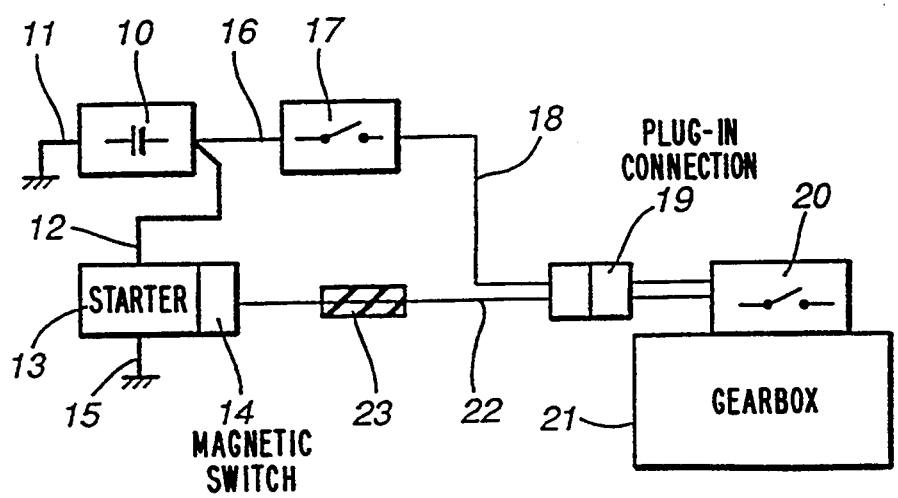
FIG. 4 shows a known device in accordance with the prior art.

This advantage, however, is achieved at the cost of adding the effective status conductor 33 and a correspondingly higher number of poles in the plug-in connection 19. In practice, however, the effective status conductor 33 can be embodied so that it is substantially more flexible and can be connected with a smaller thrust force compared with the prior art solution of FIG. 4.

Such an extra complication can be simply avoided in that a signal which is exchanged between the gearbox 21 and the gearbox control system 27 on a control path 28 takes on an implausible value by means of the starting interlock switch 20a. This implausible value is detected by the gearbox control system 27 and is processed to provide a corresponding disabling signal at the engine control unit 30. The control path 28 can be operated in both directions and does not contribute or is not required, or only to an unimportant extent, for the control of the gearbox in the positions "P" and "N".

In the two previously mentioned exemplary embodiment examples, the possibility of the internal combustion engine starting under certain, very unusual conditions is not excluded when there is a fault in the communication path 29 between the gearbox control system 27 and the engine control unit 30.

Figure 3:
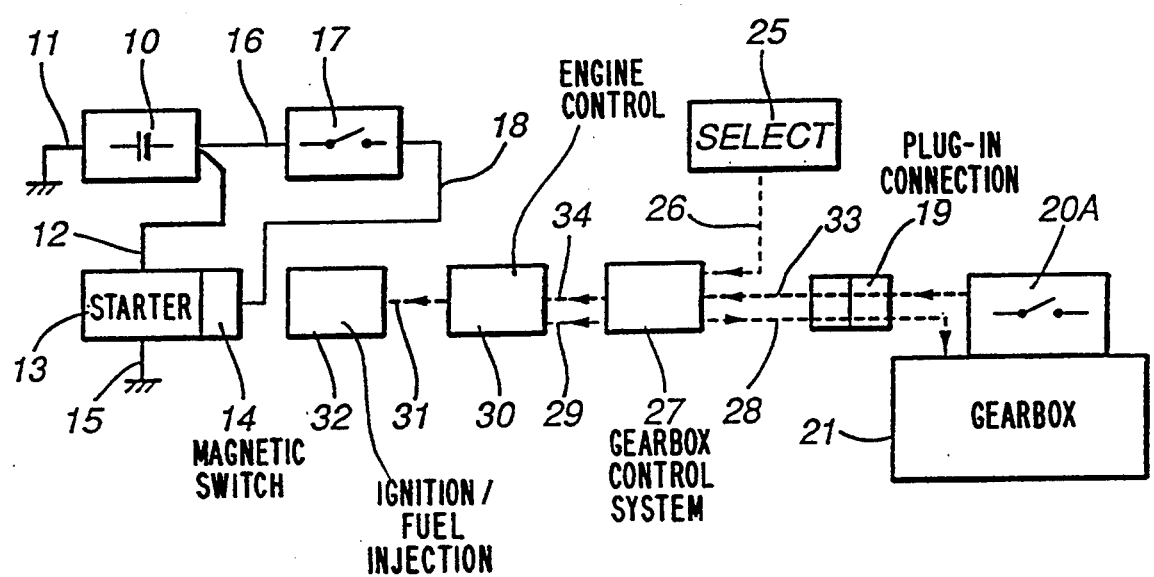
FIG. 3 shows a diagrammatic block circuit diagram of a fourth exemplary embodiment.

In accordance with the invention, a solution can be provided in accordance with the embodiment of FIG. 3 in that a disabling status conductor 34 is provided in parallel with the communication path 29, which is necessary in any case. The communication path 29 is, for example, of the serial CAN bus type. The disabling status conductor 34 redundantly transmits a disabling signal emitted by the gearbox control system 27 to the engine control unit 30 in parallel with the communication path 29. An interlock of the ignition and/or fuel metering of the internal combustion engine as a function of an actually existing driving force connection through the gearbox can be effected very reliably in this way.

Because the development trend is in the direction of accommodating a multiplicity of electronic control units, i.e. also the engine control unit and the gearbox control unit, in a common protective cover, the additional disabling status conductor 34 can in practice be effected inside such a cover so that it is very short and, preferably, as a strip conductor, of a circuit board or a flexible connector, for example, and is of particularly low cost. Maximum safety is achieved in this case with relatively little complication.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for influencing starting of an internal combustion engine of a motor vehicle that has an electronically controlled gearbox, an electrically acting interlock that prevents the internal combustion engine from being put into operation when a gearbox status causing a driving force connection is selected, a starter with an electromagnetic disengagement switch that is supplied with battery current from an ignition switch during actuation of the starter, the device comprising:

an electronic engine control unit for at least one of ignition and metering of fuel, with a communicative connection communicatively connecting the engine control unit to the gearbox control;

a direct connection from the ignition switch to the electromagnetic disengagement switch for supplying battery current to the electromagnetic disengagement switch without an intermediate disabling switch;

a recorder that records a position of an element influencing the gear-selection status of the gearbox and transmits a corresponding signal to the gearbox control;

wherein the gearbox control acts upon the engine control unit via the communicative connection to disable at least one of the ignition and the fuel metering when the element influencing the gear-selection status of the gearbox is in a position which normally effects a driving force connection through the gearbox.

2. Device according to claim 1, further comprising means for transmitting a signal that initiates the disabling of the ignition and fuel metering via the communicative connection within a serial bus log as a datum which normally disables the internal combustion engine.

3. Device according to claim 1, wherein the element influencing the gear-selection status of the gearbox is a selector lever actuated by a vehicle driver.

4. Device according to claim 1, wherein the element influencing the gear-selection status of the gearbox is a gearbox-end control element, with a change in position of the gearbox-end control element causing a directly initiated change to the gear-selection status of the gearbox.

5. Device according to claim 1, wherein the recorder is a switch through which an input to the gearbox control system is connected to a predetermined potential as a function of a switching position of the switch.

6. Device according to claim 2, further comprising an additional disabling status conductor between the gearbox control and the engine control unit, the disabling status conductor providing a transmission path for a disabling signal to the engine control unit independently of and redundant to a communicative bus connection between the gearbox control and the engine control unit.

7. Device according to claim 6, further comprising a monitor which monitors for a substantially simultaneous presence at the engine control unit of a first disabling signal via the bus connection and a second disabling signal on the additional disabling status conductor and which activates at least one fault display on an absence of one of the two disabling signals.

8. Device according to claim 1, wherein the gearbox is always driveable into a neutral gear-selection status "N" when at least one disabling signal is not output to the engine control unit.

9. Device according to claim 5, wherein the electrical signal path between the gearbox control, and the gearbox and at least one conductor via which at least one input of the gearbox control is subjected to the potential, are supplied via the same single plug-in connection on the gearbox.

10. Device according to claim 5, wherein when a gear-selection status of the gearbox with driving force connection is present when the vehicle is at rest, a signal value which normally reports the gear-selection status to the gearbox control is altered into an invalid signal value, and the gearbox control includes means for discriminating the signal value which is impermissible for this reason and processing the signal value to provide a disabling signal which is transmitted to the engine control unit.

* * * * *